(12) United States Patent
Unger et al.

(10) Patent No.: US 10,571,697 B2
(45) Date of Patent: Feb. 25, 2020

(54) OPTIC FOR HEAD MOUNTED DISPLAY

(71) Applicant: Orca West Holdings, LLC, Glendale, CO (US)

(72) Inventors: Blair Lane Unger, West Henrietta, NY (US); Peter Temple, Loveland, CO (US); William Wade Cook, Rochester, NY (US); Nathanial Alexander, Rochester, MN (US)

(73) Assignee: Orca West Holdings, LLC, Glendale, CO (US)

( * ) Notice: Subject to any disclaimer, the term of this patent is extended or adjusted under 35 U.S.C. 154(b) by 289 days.

(21) Appl. No.: 15/798,790

(22) Filed: Oct. 31, 2017

(65) Prior Publication Data

US 2019/0129173 A1 May 2, 2019

(51) Int. Cl.
*G02B 27/01* (2006.01)

(52) U.S. Cl.
CPC .... *G02B 27/0172* (2013.01); *G02B 2027/013* (2013.01); *G02B 2027/0178* (2013.01)

(58) Field of Classification Search
CPC ............ G02B 27/0172; G02B 27/0101; G02B 2027/0178; G02B 27/017; G02B 27/0149; G02B 2027/0123; G02B 27/01; G02B 2027/0187; G02B 2027/0118; G02B 2027/0127; G02B 2027/014; G02B 2027/015; G02B 27/0176; G02B 2027/011; G02B 2027/0138; G02B 27/0093; G02B 2027/0154; G02B 2027/0156; G02B 5/30; G02B 2027/0112; G02B 2027/0125; G02B 6/00; G02B 2027/0132; G02B 2027/0141; G02B 2027/0161; G02B 3/0006; G02B 2027/0134; G02B 2027/0152; G02B 2027/0169; G02B 2027/0174; G02B 26/10; G02B 5/02; G02B 5/18; G02B 2027/0121; G02B 25/001; G02B 27/0179; G02B 5/32; G02B 6/0031; G02B 17/0642; G02B 17/0663; G02B 2027/0114; G02B 2027/013; G02B 2027/0145; G02B 23/125; G02B 26/0833; G02B 27/0081; G02B 27/0103; G02B 27/141; G02B 27/144; G02B 27/283; G02B 5/04; G02B 5/10; G02B 6/0018; G02B 6/0035; G02B 6/0055; G02B 7/004; G02B 7/04; G02B 7/1822; G02B 17/006; G02B 17/02;

(Continued)

(56) References Cited

U.S. PATENT DOCUMENTS 5,699,194 A * 12/1997 Takahashi .......... G02B 27/0101
  359/630
5,734,505 A * 3/1998 Togino ............... G02B 27/0172
  359/631

(Continued)

*Primary Examiner* — Collin X Beatty
*Assistant Examiner* — Grant A Gagnon
(74) *Attorney, Agent, or Firm* — Hovey Williams LLP

(57) ABSTRACT

An optic for a head mounted display having a first concave surface, a convex surface, and a second concave surface. The first concave surface receives light incident to its surface and transmits the light. The convex surface reflects light. The second concave surface reflects the light transmitted by the first concave surface and transmits the light reflected by the convex surface so that the light reflected by the convex surface travels through the second concave surface and is emitted outwardly.

20 Claims, 8 Drawing Sheets

(58) Field of Classification Search
CPC .............. G02B 17/0816; G02B 17/086; G02B 2027/012; G02B 2027/0147; G02B 2027/0159; G02B 2027/0167; G02B 2027/0181; G02B 2027/0183; G02B 2027/0194; G02B 2027/0196; G02B 2027/0198; G02B 23/10; G02B 23/105; G02B 26/101; G02B 26/105; G02B 27/0006; G02B 27/0018; G02B 27/0025; G02B 27/0075; G02B 27/0189; G02B 27/022; G02B 27/1006; G02B 27/1073; G02B 27/1086; G02B 27/12; G02B 27/14; G02B 27/142; G02B 27/145; G02B 27/2214; G02B 27/2228; G02B 27/225; G02B 27/2278; G02B 27/24; G02B 27/286; G02B 27/4205; G02B 27/4272; G02B 27/44; G02B 27/48; G02B 3/0037; G02B 3/0043; G02B 3/0056; G02B 3/08; G02B 3/12; G02B 5/0242; G02B 5/0257; G02B 5/0278; G02B 5/045; G02B 5/085; G02B 5/1842; G02B 5/1847; G02B 5/1861; G02B 5/205; G02B 5/22; G02B 6/0033; G02B 6/0046; G02B 6/005; G02B 6/0065; G02B 6/0076; G02B 6/10; G02B 6/124; G02B 6/34; G02B 7/002; G02B 7/005; G02B 7/007; G02B 7/022; G02B 7/026; G02B 7/1821
USPC .......................................................... 359/630
See application file for complete search history.

(56) References Cited

U.S. PATENT DOCUMENTS

2002/0024743 A1\* 2/2002 Endo .................... G02B 5/3016
359/643
2017/0153662 A1\* 6/2017 Tsai ......................... G02B 3/08

\* cited by examiner

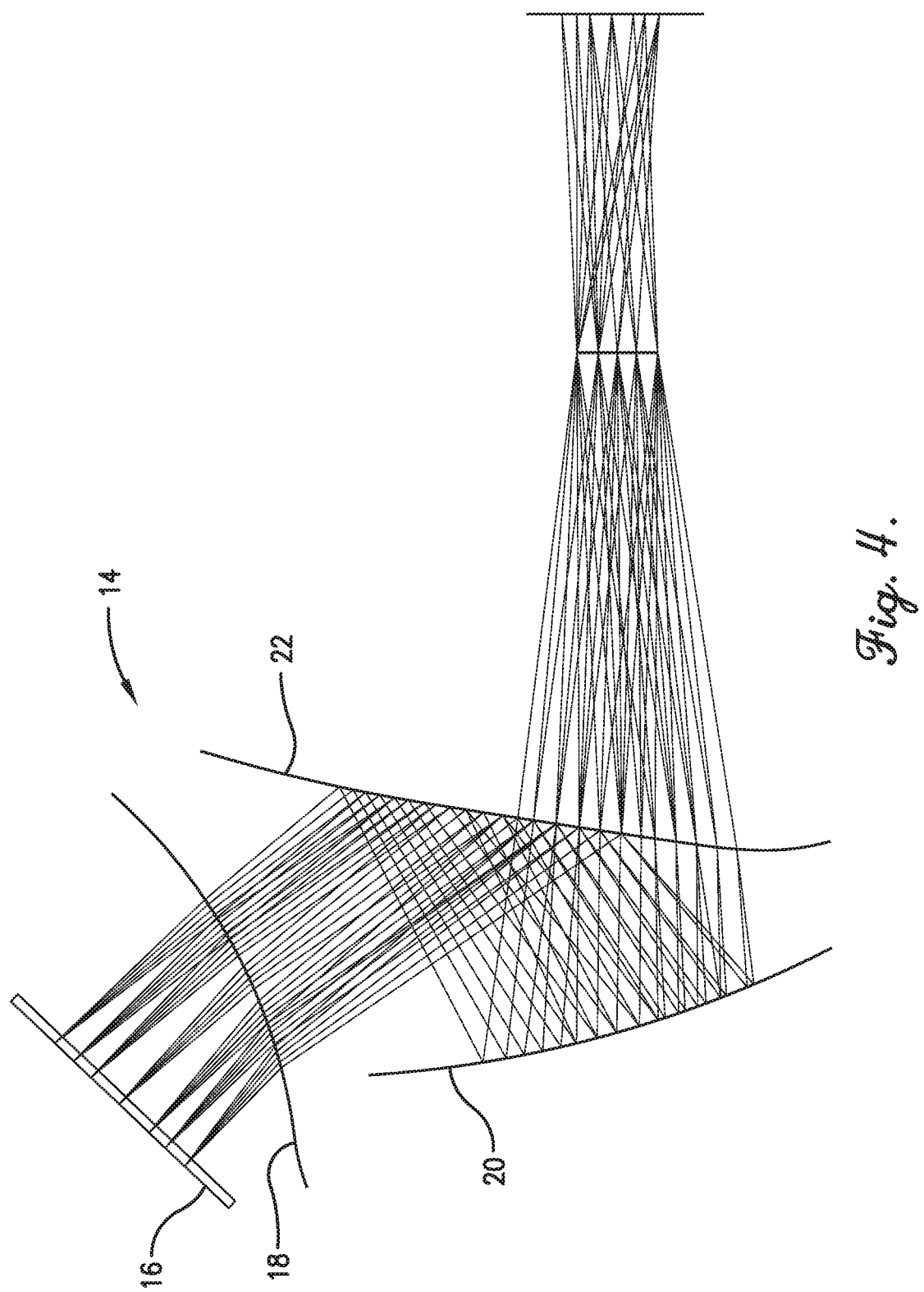

OPTIC FOR HEAD MOUNTED DISPLAY

BACKGROUND

Head mounted displays (HMDs) enable users to view text, videos, and other media without having to divert their eyes. HMDs also enhance entertainment experiences by providing a more immersive environment. HMDs may also provide useful information to users while performing tasks such as medical procedures operation of cars, operation of machinery, or the like.

HMDs use optics to direct images from various sources to the users' eyes. However, current optics often fail to provide clear images for various reasons such as intrusion by ambient light, which causes the directed images to appear dimmer as seen by the user.

This background discussion is intended to provide information related to the present invention which is not necessarily prior art.

SUMMARY

The present invention solves the above-described problems and other problems by providing a distinct advance in the art of head mounted displays (HMDs). More particularly, the present invention provides an HMD having an optic that provides a clearer image for a user and that can be mounted in a convenient manner.

An HMD constructed according to one embodiment of the present invention broadly includes a mount, an optic, and an emitter. The mount supports the optic and the emitter and is configured to fit on a user's head.

The optic directs light from the emitter to a user's field of vision and includes a first concave surface, a convex surface, and a second concave surface. The first concave surface is configured to receive light incident to its surface and transmit the light. The convex surface is configured to reflect light. The second concave surface is configured to reflect the light transmitted by the first concave surface and transmit the light reflected by the convex surface.

The emitter emits the light into the first concave surface of the optic so that the light is transmitted through the first concave surface, reflected by the second concave surface, reflected by the convex surface, transmitted through the second concave surface, and emitted outwardly from the second concave surface.

This embodiment provides numerous advantages including providing a clearer image for the user by reducing ambient light intrusion. For example, the shape of the first concave surface of the optic acts as a shield reducing the amount of ambient light entering the first concave surface.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein:

FIG. 4 is a schematic diagram of a light path through the optic of FIG. 2;

Figure 1:
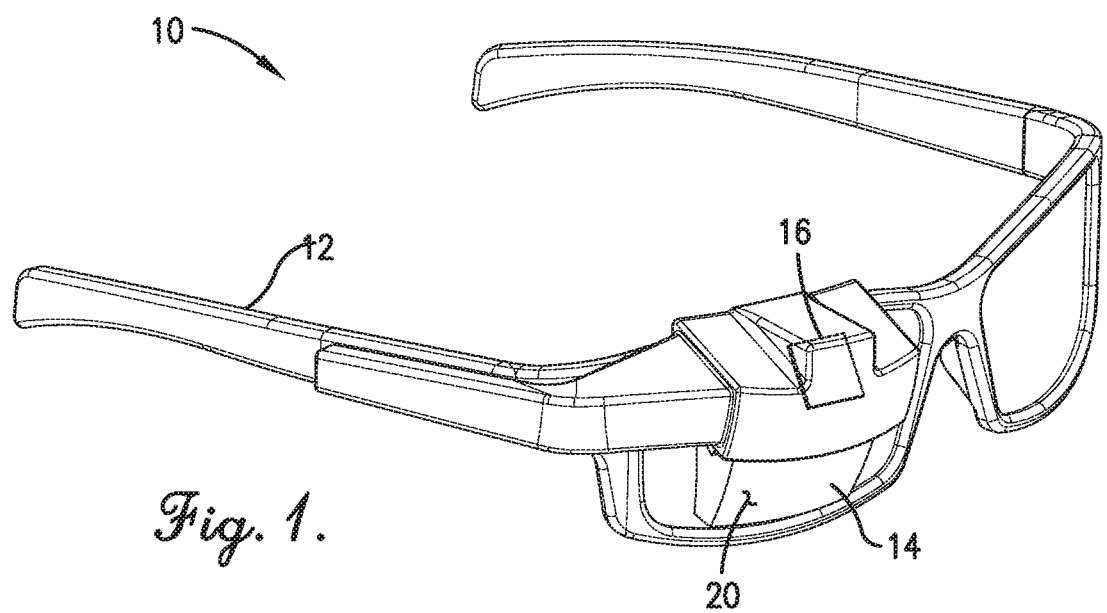
FIG. 1 is a perspective view of a head mounted display (HMD) constructed in accordance with an embodiment of the present invention.
Figure 2:
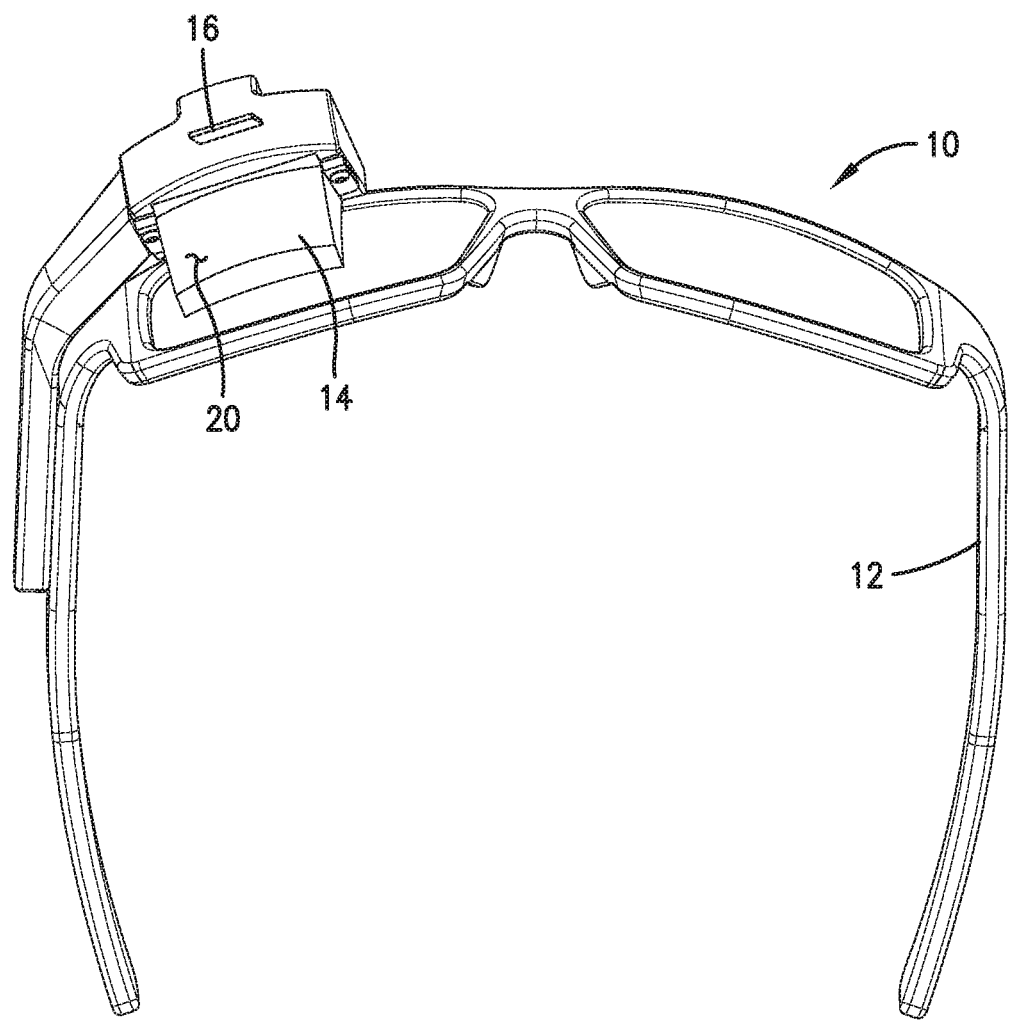
FIG. 2 is another perspective view of the HMD of FIG. 1.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Turning now to the drawing figures, and particularly FIG. 1, a head mounted display (HMD) 10 constructed in accordance with an embodiment of the invention is illustrated. The HMD 10 provides a hands-free display with a clear image. The HMD 10 constructed in accordance with this embodiment may broadly include a mount 12, an optic 14, and an emitter 16. In some embodiments, the HMD 10 may include two optics 14 and two emitters 16, one for each eye.

The mount 12 is configured to attach to a user's head and support the optic 14 and the emitter 16. For example, the mount 12 may be a pair of sunglasses, goggles, eye glasses, or the like. The mount 12 may also be a headband, headgear, a hat, a helmet, or the like.

The optic 14 is supported on the mount 12 and configured to direct light from the emitter 16 to a user's field of vision. The optic 14 may be oriented in any position relative to the mount 12. In one embodiment, the optic 14 is positioned on the mount 12 so that the optic 14 extends horizontally relative to a user's head. In another embodiment, the optic 14 is positioned so that it extends vertically relative to a user's head, as shown in FIG. 1. The optic 14 may be made of a clear material such as glass, cyclic olefin polymer, acrylic plastic, polystyrene, polycarbonate, cyclic olefin copolymer, or the like.

Figure 3:
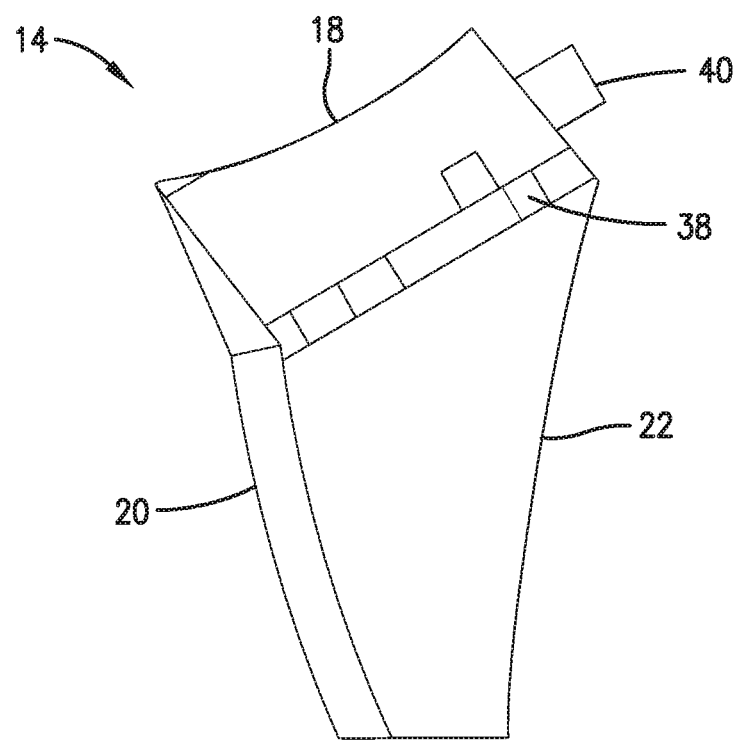
FIG. 3 is a top perspective view of an optic of the HMD of FIG. 1.

As best shown in FIG. 3, the optic 14 includes a first concave surface 18, a convex surface 20, and a second concave surface 22. The first concave surface 18, convex surface 20, and second concave surface 22 may be biconic in shape having two different radii on their surfaces. The optic 14 may be positioned on the mount 12 so that the second concave surface 22 is about 22.9 to 24.9 millimeters away from a user's pupil. In one embodiment, the optic 14 may be mounted so that the second concave surface 22 is positioned around 23.9 millimeters from the user's pupil.

Figure 6:
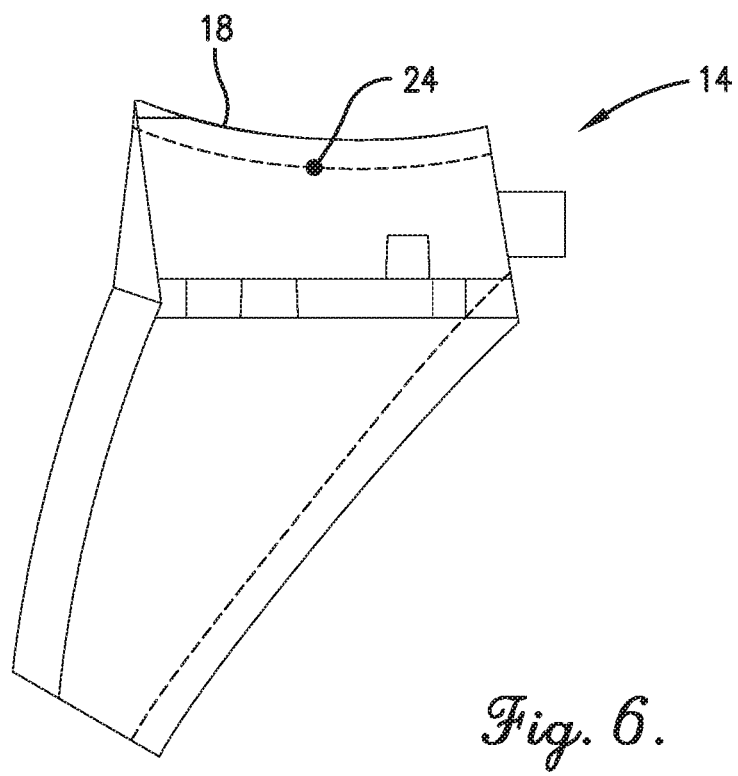
FIG. 6 is a top perspective view of the optic of FIG. 3 showing an apex of a surface of the optic in FIG. 3.
Figure 9:
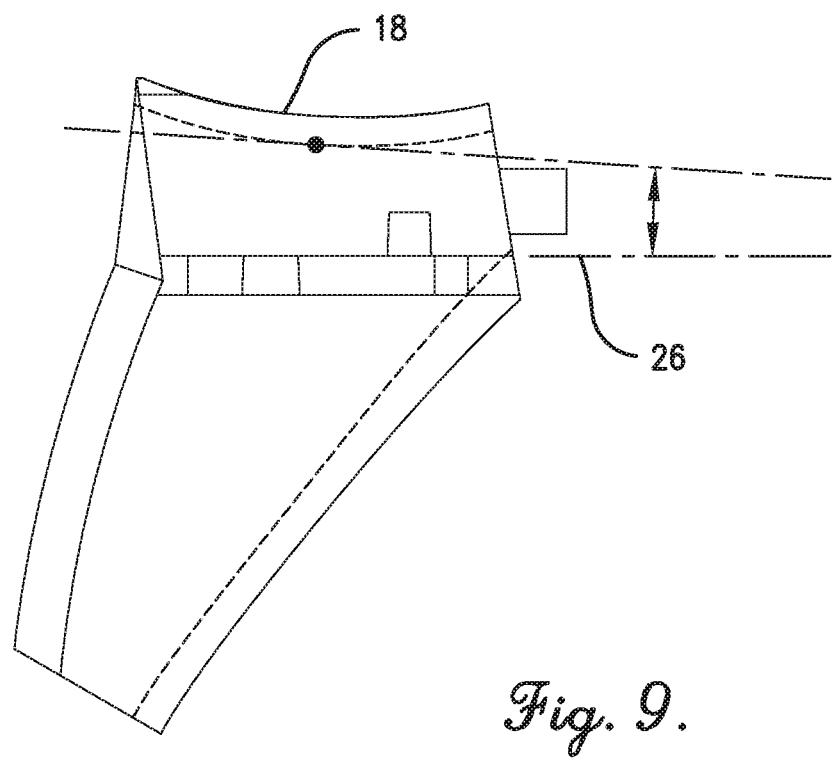
FIG. 9 is a top perspective view of the optic of FIG. 3 showing an angle of a surface of the optic in FIG. 3.
Figure 12:
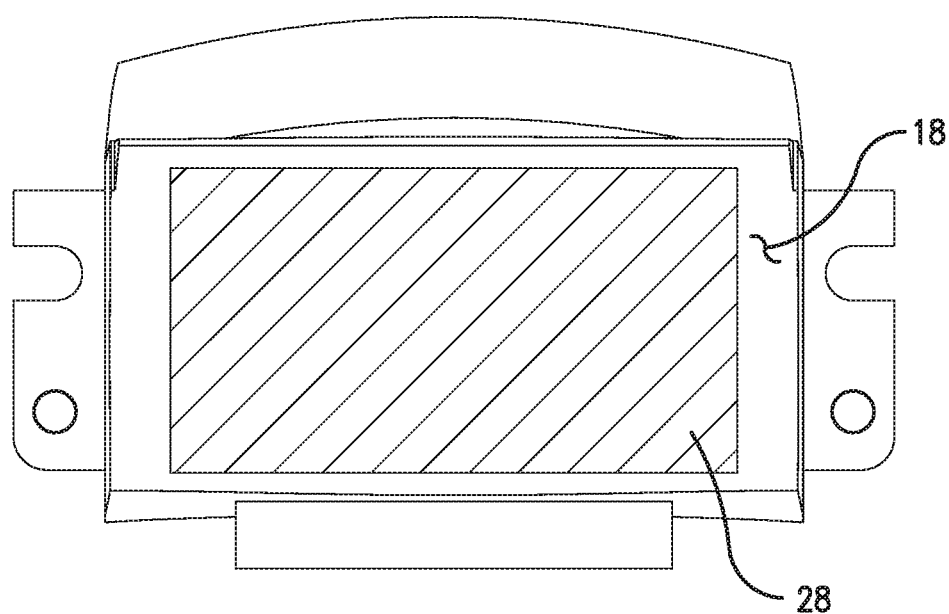
FIG. 12 is a side perspective view of a surface of the optic of FIG. 3 showing a clear aperture.
Figure 13:
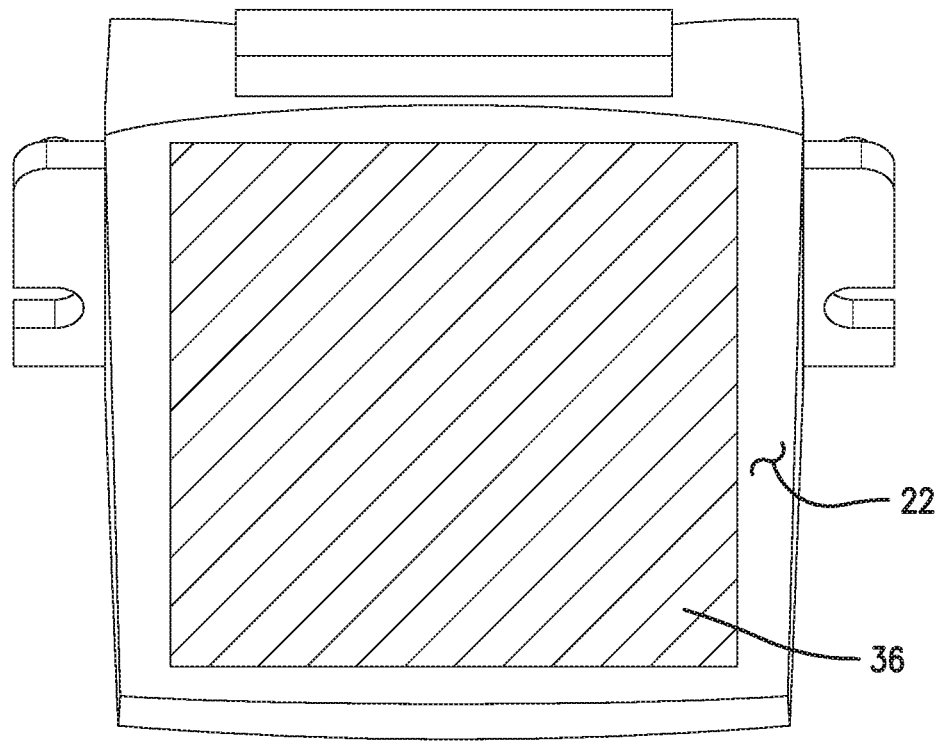
FIG. 13 is a side perspective view of a surface of the optic of FIG. 3 showing a clear aperture.

The first concave surface 18 is configured to receive light incident to its surface from the emitter 16 and transmit the light. The concave shape of the first concave surface 18 helps reduce intrusion by external light sources, such as ambient light. The first concave surface 18 may have an apex 24 that is off-center, as shown in FIG. 6. The first concave surface 18 may also be oriented at an angle relative to an axis 26 shown in FIG. 9. The angle may be an acute angle having a range from about 3.3 to 4.3 degrees. In one embodiment, the first concave surface 18 is oriented at an angle of around 3.8 degrees relative to the axis 26. The first concave surface 18 may have a clear aperture 28 that takes up most of its surface area. In one embodiment, as shown in FIG. 12, the first concave surface 18 may have a rectangular clear aperture 28 having a first length of about 26 millimeters and a second length of about 14 millimeters. The size of the clear aperture 28 may vary depending on the size of the optic 14. The first concave surface 18 may have various curvatures along a first direction and a second direction. In one embodiment the curvature along the first direction ranges from about 4.83 to 5.34 inverse meters, and the curvature along the second direction ranges from about 3.53 to 3.79 inverse meters. In one embodiment, the curvature along the first direction is around 5.07 inverse meters, and the curvature along the second direction is around 3.655 inverse meters.

Figure 8:
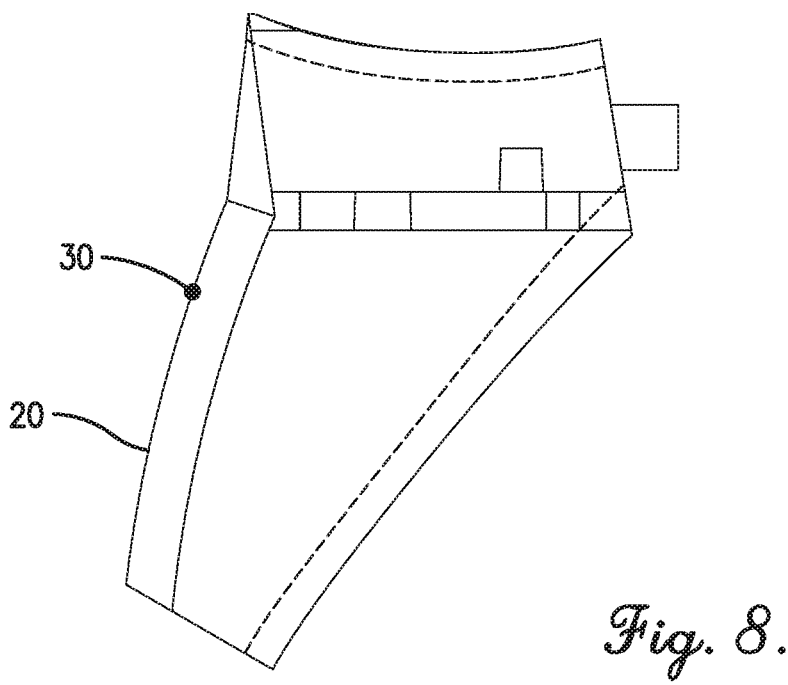
FIG. 8 is a top perspective view of the optic of FIG. 3 showing an apex of a surface of the optic in FIG. 3.
Figure 11:
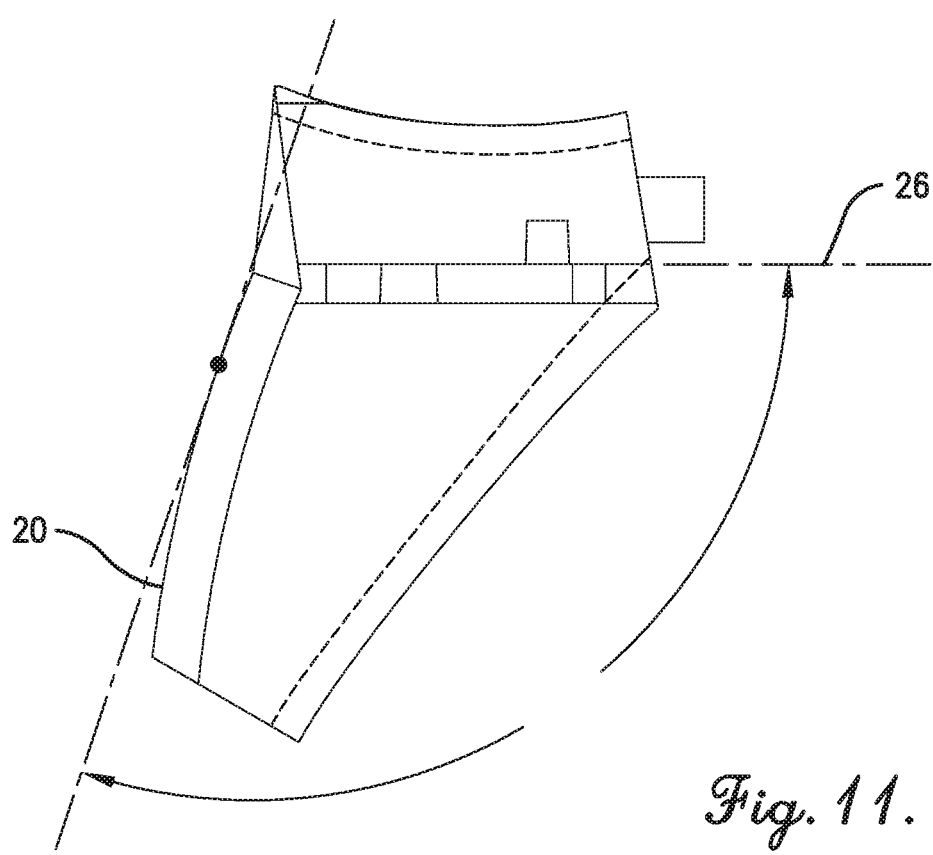
FIG. 11 is a top perspective view of the optic of FIG. 3 showing an angle of a surface of the optic in FIG. 3.
Figure 14:
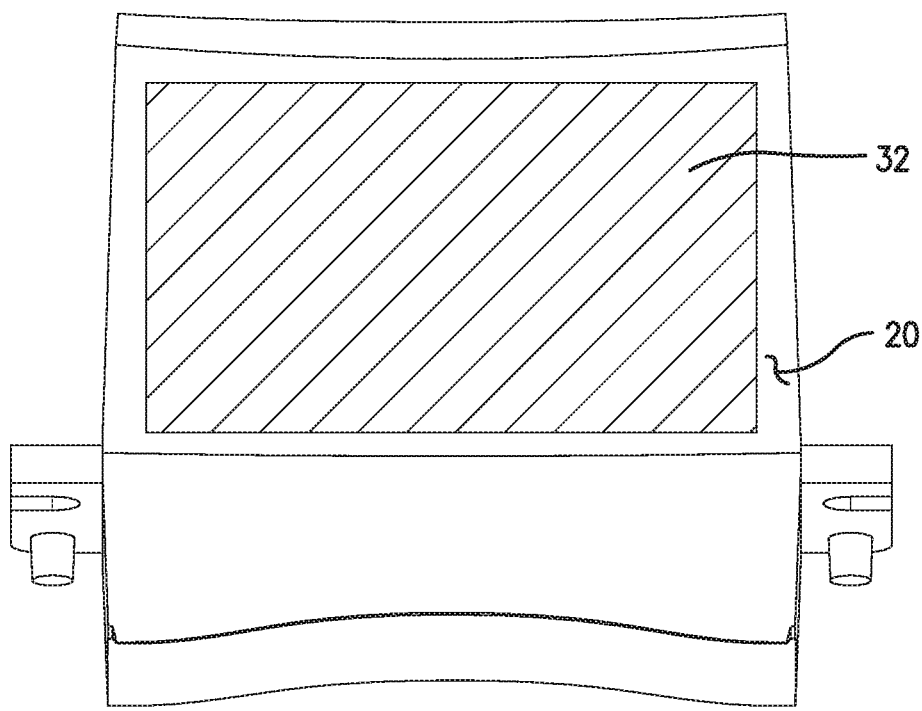
FIG. 14 is a side perspective view of a surface of the optic of FIG. 3 showing a clear aperture.

The convex surface 20 is configured to reflect light that has been reflected from the second concave surface 22. The convex surface 20 may have an apex 30 that is off-center, as shown in FIG. 8. The convex surface 20 may also be oriented at an angle relative to the axis 26 shown in FIG. 11. The angle may be an obtuse angle having a range from about 108.06 to 109.06 degrees. In one embodiment, the convex surface 20 may be oriented at an angle of around 108.56 degrees relative to the axis 26. The convex surface 20 may have a clear aperture 32 that takes up most of its surface area. In one embodiment, as shown in FIG. 14, the convex surface 20 may have a rectangular clear aperture 32 having a first length of about 28 millimeters and a second length of about 16 millimeters. The size of the clear aperture 32 may vary depending on the size of the optic 14. The convex surface 20 may have various curvatures along a first direction and a second direction. In one embodiment the curvature along the first direction ranges from about 17.48 to 26.87 inverse meters, and the curvature along the second direction ranges from about 18.88 to 30.34 inverse meters. In one embodiment, the curvature along the first direction is around 21.18 inverse meters, and the curvature along the second direction is around 23.28 inverse meters.

Figure 7:
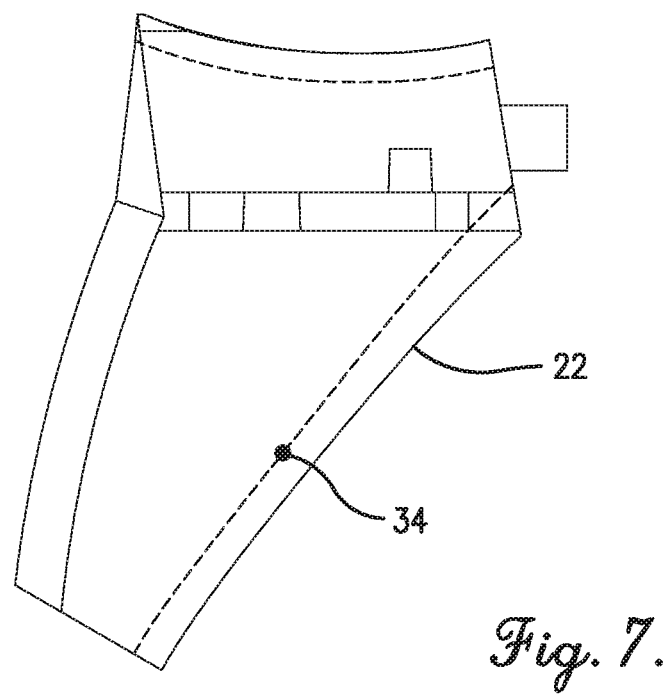
FIG. 7 is a top perspective view of the optic of FIG. 3 showing an apex of a surface of the optic in FIG. 3.
Figure 10:
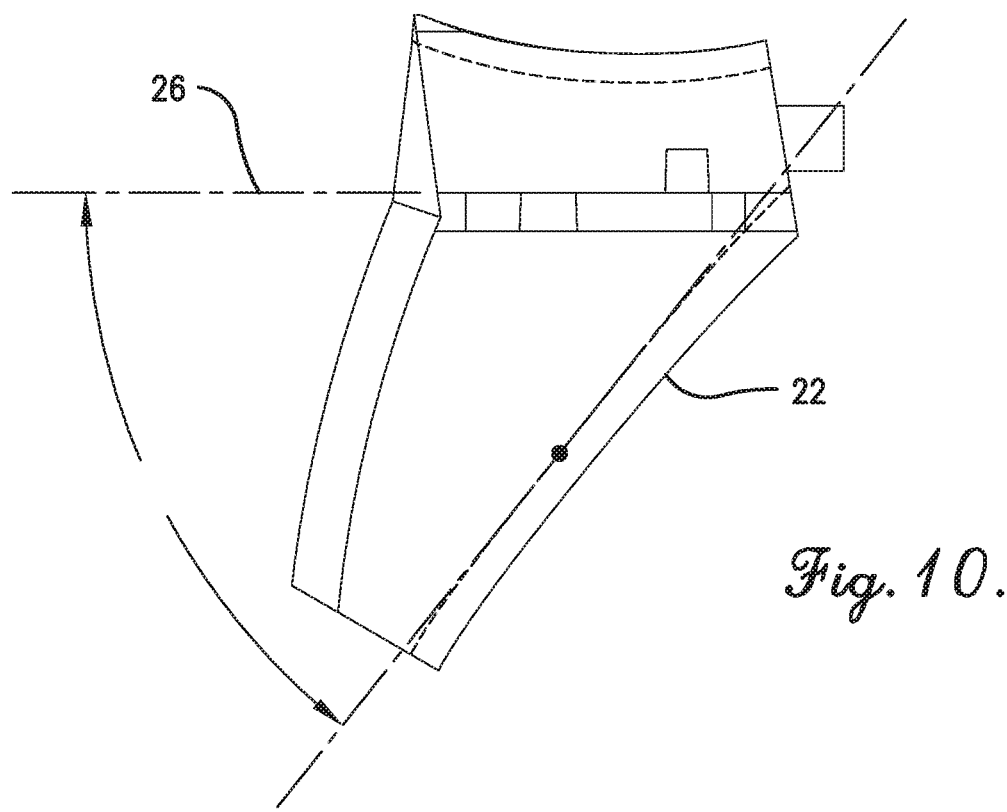
FIG. 10 is a top perspective view of the optic of FIG. 3 showing an angle of a surface of the optic in FIG. 3.

The second concave surface 22 is configured to transmit the light reflected by the convex surface 20 and reflect the light transmitted by the first concave surface 18. The second concave surface 22 may have an apex 34 that is off-center, as shown in FIG. 7. The second concave surface 22 may also be oriented at an angle relative to the axis 26 shown in FIG. 10. The angle may be an acute angle having a range from about 50.94 to 51.94 degrees. In one embodiment, the second concave surface 22 is oriented at an angle of around 51.44 degrees relative to the axis 26. The second concave surface 22 may have a clear aperture 36 that takes up most of its surface area. In one embodiment, as shown in FIG. 12, the second concave surface 22 may have a rectangular clear aperture 36 having a first length of about 26 millimeters and a second length of about 24 millimeters. The size of the clear aperture 36 may vary depending on the size of the optic 14. The second concave surface 22 may have various curvatures along a first direction and a second direction. In one embodiment the curvature along the first direction ranges from about 29.16 to 71.28 inverse meters, and the curvature along the second direction ranges from about 13.49 to 18.47 inverse meters. In one embodiment, the curvature along the first direction is around 41.62 inverse meters, and the curvature along the second direction is around 15.59 inverse meters.

As shown in FIG. 4, the optic 14 is positioned so that the light emitted by the emitter 16 is transmitted by the first concave surface 18, reflected by the second concave surface 22, reflected by the convex surface 20, and transmitted by the second concave surface 22. The light transmitted by the second concave surface 22 is emitted into a user's field of vision.

Figure 5:
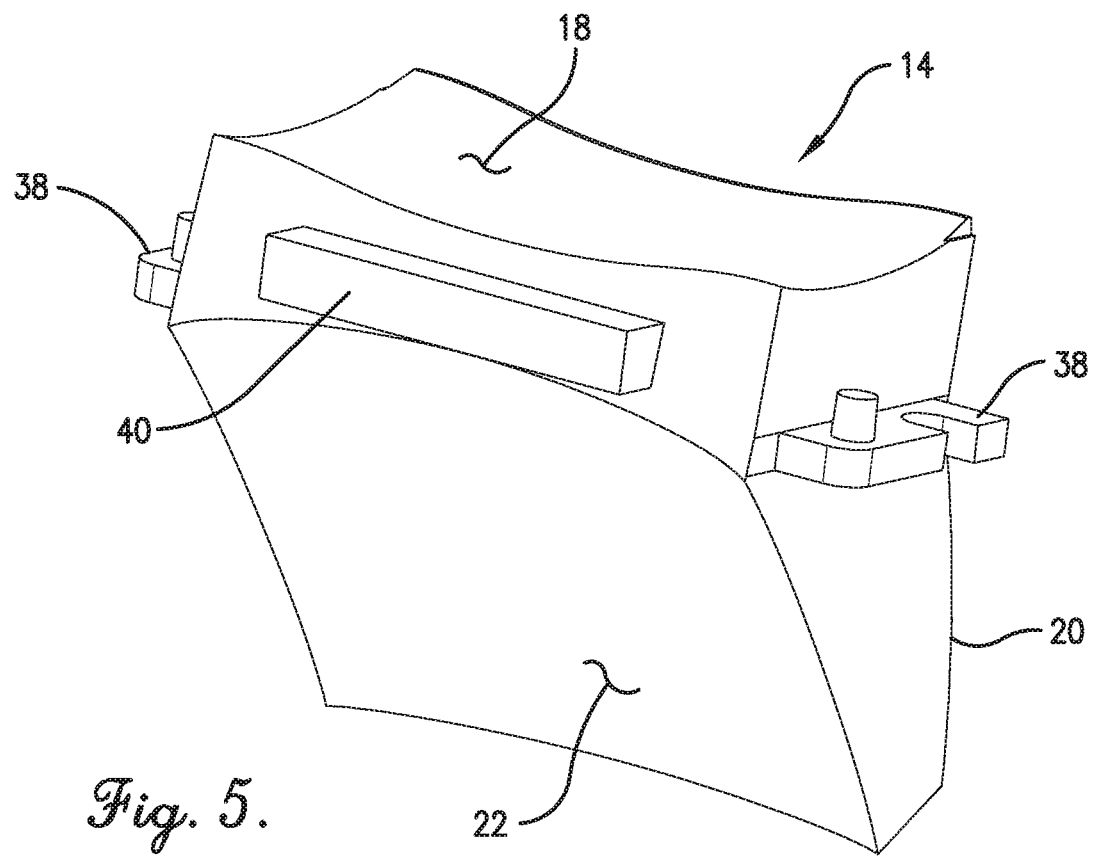
FIG. 5 is a perspective view of the optic of FIG. 3 showing connecting elements.

As best shown in FIG. 5, the optic 14 may also have connection elements 38 that attach to the mount 12. The connection elements 38 may be integral with the optic 14 or attached thereto. The connection elements 38 may be any connecting apparatus known in the art including solid connectors or glue. The optic 14 may also include a tab 40 for helping attach the optic 14 to the mount 12. The tab 40 may be inserted into a recess (not shown) on the mount 12.

The emitter 16 may be any source of light. In some embodiments the emitter 16 may be any small screen known in the art including a light emitting diode (LED) screen, an organic LED (OLED) screen, a liquid crystal display (LCD), a cathode ray tube (CRT) screen, or the like. The emitter 16 may be positioned at a distance from the first concave surface 18 and at an angle relative to the axis 26 so that the clearest image is viewed by the user when the light is emitted from the second concave surface 22. The emitter 16 may be positioned at a distance of about 22.9 to 24.9 millimeters from the first concave surface 18. In one embodiment, the emitter 16 is positioned 23.9 millimeters from the first concave surface 18.

The emitter 16 may receive signals representative of videos, text, graphics, or other media from a smart phone, smart watch, controller, computer, laptop, server, or any other device with a wired or wireless connection. In one embodiment, the emitter 16 is coupled to a medical device such as a portable ultrasound system, a magnetic resonance imaging (MRI) system, or the like. Wired or wireless coupling may include signal or data transmitting and receiving circuits, such as antennas, transceivers, amplifiers, filters, mixers, oscillators, digital signal processors (DSPs), and the like. The emitter 16 may establish communication wirelessly by utilizing RF signals and/or data that comply with communication standards such as cellular 2G, 3G, or 4G, IEEE 802.11 standard such as WiFi®, IEEE 802.16 standard such as WiMAX, Bluetooth®, or combinations thereof. Alternatively, or additionally, the emitter 16 may establish communication through connectors or couplers that receive metal conductor wires or cables which are compatible with networking technologies such as ethernet. In certain embodiments, the emitter 16 may also couple with optical fiber cables.

In use, a user may couple the emitter 16 to a device. A video output of the device is transmitted to the emitter 16 which emits the video output toward the optic 14. The video output passes through the first concave surface 18, reflects off of the second concave surface 22, reflects off of the convex surface 20, and is transmitted through the second concave surface 22. The video output is then emitted from the second concave surface 22 to the user's field of vision. The shape of the first concave surface 18 reduces the amount of ambient light that interferes with the light from the emitter 16.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. An optic for a head mounted display, the optic comprising:
    a first concave surface configured to receive light incident to its surface and transmit the light;
    a convex surface configured to reflect light; and
    a second concave surface configured to reflect the light transmitted by the first concave surface and transmit the light reflected by the convex surface so that the light reflected by the convex surface travels through the second concave surface and is emitted outwardly.

2. The optic of claim 1, wherein the first concave surface, the convex surface, and the second concave surface are biconic.

3. The optic of claim 1, wherein the optic is made of cyclic olefin polymer.

4. The optic of claim 1, wherein the optic has a clear aperture on the first concave surface having a first length with a range of 25 to 27 millimeters and a second length with a range of 13 to 15 millimeters.

5. The optic of claim 1, wherein the optic has a clear aperture on the second concave surface having a first length with a range of 25 to 27 millimeters and a second length with a range of 23 to 25 millimeters.

6. The optic of claim 1, wherein the optic has a clear aperture on the convex surface having a first length with a range of 27 to 29 millimeters and a second length with a range of 15 to 17 millimeters.

7. The optic of claim 1, wherein the first concave surface has an off-center apex.

8. The optic of claim 1, wherein the optic is configured to have a clear aperture on the first biconic concave surface having a first length of 26 millimeters and a second length of 14 millimeters.

9. The optic of claim 1, wherein the optic is configured to have a clear aperture on the second concave surface having a first length of 26 millimeters and a second length of 24 millimeters.

10. The optic of claim 1, wherein the optic is configured to have a clear aperture on the convex surface having a first length of 28 millimeters and a second length of 16 millimeters.

11. The optic of claim 1, further comprising a connection element configured to attach the optic to the head mounted display.

12. The optic of claim 11, wherein the connection element presents a longitudinal axis, the first concave surface is oriented at an angle ranging from 3.3 to 4.3 degrees relative to the axis, the convex surface is oriented at an angle ranging from 108.06 to 109.06 degrees relative to the axis, and second concave is oriented at an angle ranging from 50.94 to 51.94 degrees relative to the axis.

13. The optic of claim 1, wherein the first concave surface has a curvature along a first direction having a range of 4.83 to 5.34 inverse meters.

14. The optic of claim 13, wherein the first concave surface has a curvature along a second direction perpendicular to the first direction, the curvature having a range of 3.53 to 3.79 inverse meters.

15. A head mounted display comprising:
    a mount configured to fit on a user's head;
    an optic supported on the mount and oriented so the user can look at the optic, the optic having
        a first concave surface configured to receive light incident to its surface and transmit the light,
        a convex surface configured to reflect light, and
        a second concave surface configured to reflect light transmitted by the first concave surface and transmit light reflected by the convex surface; and
    an emitter supported on the mount adjacent the optic and configured to emit light into the first concave surface of the optic so that the light is transmitted through the first concave surface, reflected by the second concave surface, reflected by the convex surface, transmitted through the second concave surface, and emitted outwardly from the second concave surface.

16. The head mounted display of claim 15, wherein the emitter is an electronic display.

17. The head mounted display of claim 15, wherein the emitter is connected to a portable ultrasound system and is configured to receive a video output therefrom.

18. The head mounted display of claim 15, wherein the emitter is positioned at a distance from a vertex of the first concave surface, the distance having a range of 6.5 to 8.5 millimeters.

19. The head mounted display of claim 15, wherein the optic is supported on the mount so that the second concave surface is a distance having a range of 22.9 to 24.9 millimeters from an eye of a user wearing the head mounted display.

20. An optic for a head mounted display, the optic comprising:
    a connection element configured to attach the optic to the head mounted display, the connection element having protrusions extending along an axis;
    a first biconic concave surface oriented at an angle ranging from 3.3 to 4.3 degrees relative to the axis, the first biconic concave surface being configured to receive light incident to its surface and transmit the light so that the light experiences a first reflection and a second reflection before being emitted;

a convex biconic surface oriented at an angle ranging from 108.06 to 109.06 degrees relative to the axis, the convex biconic surface being configured to provide the second reflection of the light;

a second biconic concave oriented at an angle ranging from 50.94 to 51.94 degrees relative to the axis, the second biconic concave surface being configured to provide the first reflection of the light transmitted by the first biconic concave surface, and transmit light reflected by the convex biconic surface so that the light reflected by the convex travels through the second biconic concave surface and is emitted outwardly.

* * * * *